United States Patent Office 3,144,438
Patented Aug. 11, 1964

3,144,438
METHOD FOR THE PREPARATION OF ORGANIC SULFIDE DERIVATIVES AND COMPOSITIONS RESULTING THEREFROM
George Sosnovsky, Chicago, Ill., assignor to IIT Research Institute, a corporation of Illinois
No Drawing. Original application Feb. 13, 1961, Ser. No. 88,627. Divided and this application Apr. 17, 1962, Ser. No. 188,258
3 Claims. (Cl. 260—329)

The present invention relates generally to the reaction of selected thioethers with peresters and to a number of novel organic compounds resulting from such process. More specifically my invention is directed to the reaction of tertiary butyl peresters with aliphatic and cyclic sulfides, to yield among others, alphaacyloxy sulfide derivatives.

By stopping the present reaction at various intermediate stages thereof, I have been able to produce a number of compositions which include those of the general category comprising acyloxy compounds, particularly α-acyloxy sulfide derivatives, alcohols, unsaturated thioethers and organic acids, all of which may be recovered by the practice of my process.

Another important aspect of my invention is the utilization of a copper salt catalyst in carrying out these processes.

The compounds resulting from the present processes are useful in a number of ways. They can be intermediates in the synthesis of biologically active chemicals, antioxidants, and additives in polymerization formulations. Of even more obvious interest is the important fact that the introduction of the acyloxy group into the sulfide molecule eliminates the well known objectionable odor commonly associated with sulfides.

The most pertinent prior art of which I am aware teaches that organic sulfides are oxidized by peroxides to sulfoxides and sulfones. Numerous preparative methods, for example, those which employ hydrogen peroxide or peracetic or perbenzoic acids, are available to the chemist active in this field. In addition to this it has been shown that organic peroxides, such as cyclohexanyl and t-butyl hydroperoxides, likewise oxidize various sulfides to sulfoxides.

In contradistinction to such teachings of the prior art I have now discovered that t-butyl peresters smoothly react in the presence of copper salt catalysts with both cyclic and acylic aliphatic sulfides, such as tetrahydrothiophene and n-propyl sulfide, to give good yields of their respective α-acyloxy derivatives. For example, the reaction of t-butyl perbenzoate with tetrahydrothiophene proceeds as follows:

$$\underset{\text{Ph}}{\bigcirc}-\overset{O}{\underset{\|}{C}}-O-O-C(CH_3)_3 + \underset{S}{\bigcirc} \xrightarrow{Cu^{+1}}$$

$$\underset{S}{\bigcirc}-O-\overset{O}{\underset{\|}{C}}-\underset{\text{Ph}}{\bigcirc} + C(CH_3)_3OH$$

Likewise t-butyl peracetate reacts with n-propyl sulfide:

$$CH_3\overset{O}{\underset{\|}{C}}-O-O-C(CH_3)_3 + CH_3CH_2-CH_2-S-CH_2CH_2-CH_3 \xrightarrow{Cu^{+1}}$$

$$CH_3CH_2CHSCH_2CH_2CH_3 + C(CH_3)_3OH$$
$$\underset{\underset{O}{\overset{\|}{O}}}{\overset{|}{O}-C-CH_3}$$

No sulfoxides or sulfones were observed in such reactions, this in distinction to what one would expect from the prior art teachings.

It should be noted that in the absence of the catalyst the yield of the α-acyloxy derivatives and the rate of the reaction was decreased whereas the amount of the corresponding acid was increased. Quantitative examples are set out in detail below.

Accordingly, one object of my invention is to provide a novel process of making alpha-acyloxy sulfide derivatives and to produce a number of novel compositions of this class.

These and other objects, features and advantages of my invention will become apparent to those skilled in this particular art from the following detailed disclosure thereof.

Commencing with one of the most simple embodiments hereof, I have discovered that compounds such as diethylsulfide readily react in the presence of copper ion, particularly cuprous, with t-butyl peresters, e.g., peracetate, to yield α-acyloxy compounds. Thus:

$$CH_3CH_2SCH_2CH_3 + CH_3\overset{O}{\underset{\|}{C}}-O-O-C(CH_3)_3 \xrightarrow{Cu^{+1}}$$

$$CH_3CHSCH_2CH_3 + C(CH_3)_3OH$$
$$\underset{\underset{O}{\overset{\|}{O}}}{\overset{|}{O}-C-CH_3}$$

In its most general terms this aspect of my invention, namely the preparation of α-acyloxy sulfide derivatives is seen from the following reaction:

$$R^1-CH_2-S-R^2 + R^3-C-O-O-C(CH_3)_3 \xrightarrow{Cu^{+1}}$$

$$R^1-CH-S-R^2 + C(CH_3)_3OH$$
$$\underset{\underset{O}{\overset{\|}{O}}}{\overset{|}{O}-C-R^3}$$

wherein $R^1$, $R^2$ and $R^3$ comprise alkyl or aryl groups or the like and may be the same or different.

In such reaction it is noted that the perester splits between its oxygen bonds while at the same time one alpha hydrogen atom splits off the sulfide. Such hydrogen combines with the $C(CH_3)_3O—$ to form t-butyl alcohol whereas the acyloxy radical, $$R^3-C\overset{\nearrow O}{\underset{\searrow O}{}}$$

adds to the α-carbon atom vacated by such hydrogen. This concludes the first step of my reaction.

While I am not completely certain of the theoretical considerations or chemical mechanisms which underlie the broadest aspects of my process, apparently such is a two-step affair generally speaking as follows:

I. Thioether + perester $\xrightarrow{Cu^{+1}}$ acyloxy + alcohol

II. Acyloxy $\xrightarrow{\text{heat}}$ unsaturated thioether + acid

In structural terms such process may then be envisioned as follows:

I. 
$$R^1CH_2-CH_2-S-R^2 + R^3-\overset{O}{\underset{\|}{C}}-O-O-C(CH_3)_3 \xrightarrow{Cu^{+1}}$$
$$R^1-CH_2-CH-S-R^2 + C(CH_3)_3OH$$
$$\underset{\underset{O}{\overset{\|}{O}}}{\overset{|}{O}-C-R^3}$$

II. $R^1CH_2CH-S-R^2 \xrightarrow{\text{heat}} R^1CH=C-S-R^2 + HO-\overset{O}{\underset{\|}{C}}-R^3$
$$\underset{\underset{O}{\overset{\|}{O}}}{\overset{|}{O}-C-R^3}$$

One of the important aspects of my invention involves the reaction of tetrahydrothiophene with t-butyl peresters to first form α-acyloxy derivatives and then the unsaturated compound, 2,3 dihydrothiophene. Thus:

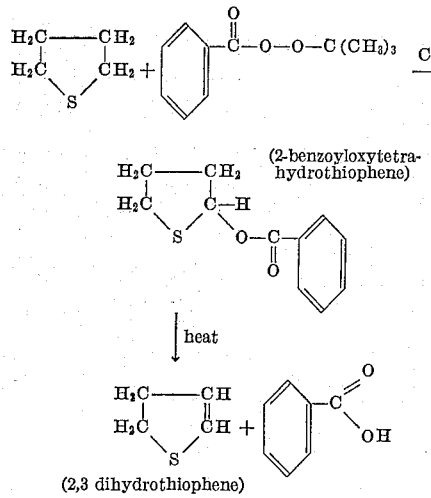

When t-butyl peracetate is employed the following reactions occur:

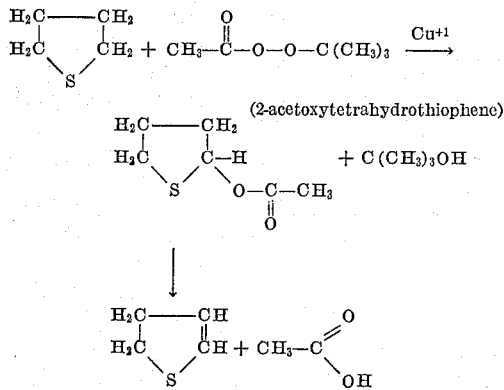

Instead of employing the cyclic sulfide compounds, as noted above, the present is likewise useful with straight chain aliphatic sulfides. Thus:

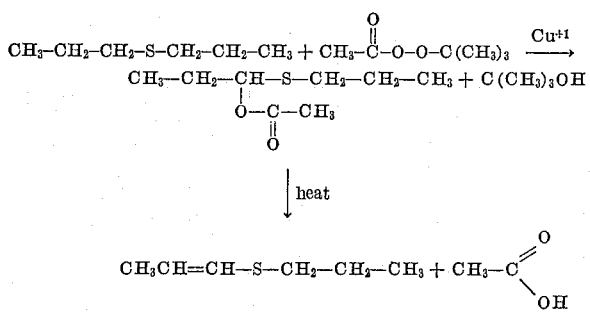

My invention may be further understood by reference to the following specific examples:

*Example I*

To a mixture of tetrahydrothiophene (44 g., 0.5 mole) and cuprous bromide (0.1 g., 0.35 millimole) there was added t-butyl perbenzoate (50 g., 0.25 mole) over a four hour period while the reaction mixture was maintained at a temperature of between 95° and 105° C. Following this the reaction mixture was cooled to room temperature, 50 ml. ether was added and such solution was then washed with 2 N sodium carbonate to remove benzoic acid (9.7 g., 25% yield). The remaining ethereal solution was then washed with water, dried with sodium sulfate and concentrated on a steam bath. I then distilled the remaining oil at reduced pressure to obtain the following:

Tetrahydrothiophene, 15 g. _____ (A)
2-benzoxytetrahydrothiophene, 36 g. _____ (B)

As to compound B it is noted that this represent a yield of 70%. The compound was characterized by a $n_D^{25}$ of 0.5662 and could not be fuurther distilled without decomposition. Purification for subsequent analysis was then carried out by chromatography on alumina with the following results:

| Analysis for $C_{11}H_{12}SO_2$ | Calc'd. | Found |
|---|---|---|
| C | 63.45 | 63.13 |
| H | 5.81 | 6.08 |
| Mol. Wt | 208 | 192 |
| $n_D^{25}$ | | 1.5650 |

*Example II*

A mixture of the following was heated at 90° C. for six hours:

Tetrahydrothiophene, 44 g. _____ mole __ 0.5
t-Butyl peracetate (57 ml. of a 75% benzene solution _____ mole __ 0.3
Cuprous bromide _____ millimole __ 0.35

After the usual workup of cooling, washing, drying, concentration, etc., as set out above, the remaining oil was distilled. The major products of such distillation were:

Tetrahydrothiphene _____ 10 grams.
Residue _____ 2 grams.
2-acetoxytetrahydrothiophene _____ 25 grams (56%).

The latter such compound is characterized as follows:

| Analysis for $C_6H_{10}O_2S$ | Calc'd. | Found |
|---|---|---|
| C | 49.31 | 49.53 |
| H | 6.90 | 7.16 |
| Mol. Wt | 146 | 141 |
| B.P. (0.1 mm.), ° C | | 60–62 |
| $n_D^{25}$ | | 1.4893 |

It may be interesting to note that without the cuprous bromide and after ten hours of reaction time, the same reactants gave only a 38% yield of 2-acetoxytetrahydrothiophene.

*Example III*

Tertiary butyl perbenzoate (40 g., 0.2 mole) was added over a five hour period to a mixture of n-propyl sulfide (48 g., 0.4 mole), benzene (50 ml.) and cuprous bromide (0.35 millimole) at 85°–90° C. After cooling the reaction mixture was washed with 2 N sodium carbonate solution to remove benzoic acid, 6 g. (25%). The oil remaining was distilled at reduced pressure to yield the following:

Grams
n-Propyl sulfide _____ 12
1-benzoyloxy dipropyl sulfide (69% yield) ____ 33

The latter such compound is characterized as follows:

| Analysis for $C_{13}H_{18}O_2S$ | Calc'd. | Found |
|---|---|---|
| C | 65.53 | 65.59 |
| H | 7.61 | 7.73 |
| S | 13.47 | 13.74 |
| Mol. Wt | 238 | 231 |
| B.P. (0.4 mm.), ° C | | 88–90 |
| $n_D^{25}$ | | 1.5175 |
| I.R. cm$^{-1}$ | | 1,730 |

Under similar experimental conditions, but without catalyst, 41% benzoic acid and 52% of 1-benzoyloxy dipropyl sulfide were obtained.

Example IV 2-benzoyloxytetrahydrothiophene (7 g. 0.035 mole) was heated to 110° to 140° C. for two hours in a partial vacuum (10 mm. Hg) in apparatus provided with a trap. 2,3 dihydrothiophene, 2.4 grams, representing a yield of 83% was condensed in such trap as cooled by a Dry-Ice isopropanol mixture. Such product was then distilled to a constant refractive index, noted below. Gas chromatography showed one large peak; less than 1% impurities were present.

| Analysis for $C_4H_6S$ | Calc'd. | Found |
|---|---|---|
| C | 55.76 | 55.41 |
| H | 7.03 | 7.21 |
| Mol. Wt. | 86 | 88 |
| B.P. (100 mm.), °C | | 48 |
| $n_D^{25}$ | | 1.5268 |

The pot residue provided a quantitative yield of benzoic acid.

This application is a divisional application of U.S. Serial No. 88,627, filed February 13, 1961, now abandoned.

It will be understood that various modification and variations may be effected without departing from the spirit or scope of the novel concepts of my invention.

I claim as my invention:

1. The method of making 2-benzoxytetrahydrothiophene which comprises the steps of: reacting tetrahydrothiophene with tertiary butyl perbenzoate in the presence of cuprous bromide and separating said 2-benzoxytetrahydrothiophene from the other reaction products.

2. The method of making 2-acetoxytetrahydrothiophene which comprises the steps of: reacting tetrahydrothiophene with tertiary butyl peracetate in the presence of cuprous bromide, and separating said 2-acetoxytetrahydrothiophene from the other reaction products.

3. The method of making 2,3 dihydrothiophene which comprises the steps of: heating 2-benzoyloxytetrahydrothiophene in a partial vacuum and collecting said 2,3 dihydrothiophene as heating progresses.

References Cited in the file of this patent

Horner et al.: Annalen, vol. 602, pp. 135–53 (1957).

Denney: Dissertation Abstracts, vol. 20, pp. 1166–67 (1959).